United States Patent [19]

Reed et al.

[11] 3,818,250

[45] June 18, 1974

[54] BISTABLE MULTIVIBRATOR CIRCUIT

[75] Inventors: L. J. Reed, Mesa; Ronald L. Treadway, Scottsdale, both of Ariz.

[73] Assignee: Motorola, Inc., Franklin Park, Ill.

[22] Filed: Feb. 7, 1973

[21] Appl. No.: 330,181

[52] U.S. Cl. ............. 307/289, 307/215, 307/225 R, 307/235 R

[51] Int. Cl. ......................H03k 3/286, H03k/21/06

[58] Field of Search ........... 307/213, 214, 215, 218, 307/225, 235 R, 289, 290; 330/30 D, 69

[56] References Cited

UNITED STATES PATENTS

| | | | |
|---|---|---|---|
| 3,424,928 | 1/1969 | Priel et al. | 307/289 X |
| 3,440,449 | 4/1969 | Priel et al. | 307/289 X |
| 3,445,780 | 5/1969 | Beelitz | 330/30 D X |
| 3,517,211 | 6/1970 | Firth | 307/289 X |
| 3,522,446 | 8/1970 | Kodama | 307/215 |
| 3,539,831 | 11/1970 | Gilbert | 307/235 |
| 3,550,040 | 12/1970 | Sinusas | 330/30 D X |
| 3,612,911 | 10/1971 | Kroos | 307/213 X |
| 3,728,561 | 4/1973 | Brocker, Jr. | 307/291 |

*Primary Examiner*—Rudolph V. Rolinec
*Assistant Examiner*—L. N. Anagnos
*Attorney, Agent, or Firm*—Mueller, Aichele & Ptak

[57] ABSTRACT

A bistable multivibrator circuit which is readily adaptable to monolithic integrated circuit technology combines the master and slave portions and utilizes split current sources to reduce the components needed to provide a master/slave circuit operation when the multivibrator is used either as a frequency divider or as a gated logic circuit.

11 Claims, 4 Drawing Figures

BISTABLE MULTIVIBRATOR CIRCUIT

RELATED APPLICATIONS

Co-pending application Ser. No. 211,508, filed Dec. 23, 1971, now U.S. Pat. No. 3,728,560, which in turn is a continuation-in-part of applications Ser. Nos. 110,863 and 110,932, both filed on Jan. 29, 1971 and now abandoned, are related to the subject matter of this application.

BACKGROUND OF THE INVENTION

Bistable multivibrators fabricated as monolithic integrated circuits often comprise separate master and slave sections, with the circuit connections and inputs to the multivibrator determining whether the multivibrator is operated as a frequency divider or as a gated logic circuit. Generally, each of the master and slave sections is supplied with operating current from a separate constant current source; and because of the duplication required for the master and slave sections, the mutlivibrators include a relatively large number of components.

It is desirable to reduce the number of components which are required to implement a master/slave bistable multivibrator function.

SUMMARY OF THE INVENTION

Accordingly, it is an object of this invention to provide an improved bistable multivibrator circuit.

It is another object of this invention to reduce the number of components in a master/slave emitter-coupled flip-flop circuit.

It is an additional object of this invention to use split common current sources for both sections of a master/-slave bistable multivibrator circuit.

In accordance with a preferred embodiment of this invention, a bistable multivibrator is comprised of first and second sections, the first of which has at least first and second transistors and the second of which has at least third, fourth, fifth and sixth transistors. The collector electrodes of all of the transistors in the first and second sections are coupled with a first voltage supply terminal. The emitters of the transistors in the two sections are coupled to two different current sources through different outputs of a split current steering gate having first and second portions and operated in accordance with input or clock signals. Emitter-follower feedback transistors apply feedback signals to the bases of transistors in each of the sections. The feedback for the second section is controlled by the collector of another of the transistors in that same section, and the feedback for the first section is controlled by one of the transistors in that section and one of the transistors in the second section. The conductivities of the two transistors in the second section which are coupled with the bases of the feedback transistors vary in the same manner.

DETAILED DESCRIPTION

Figure 1:
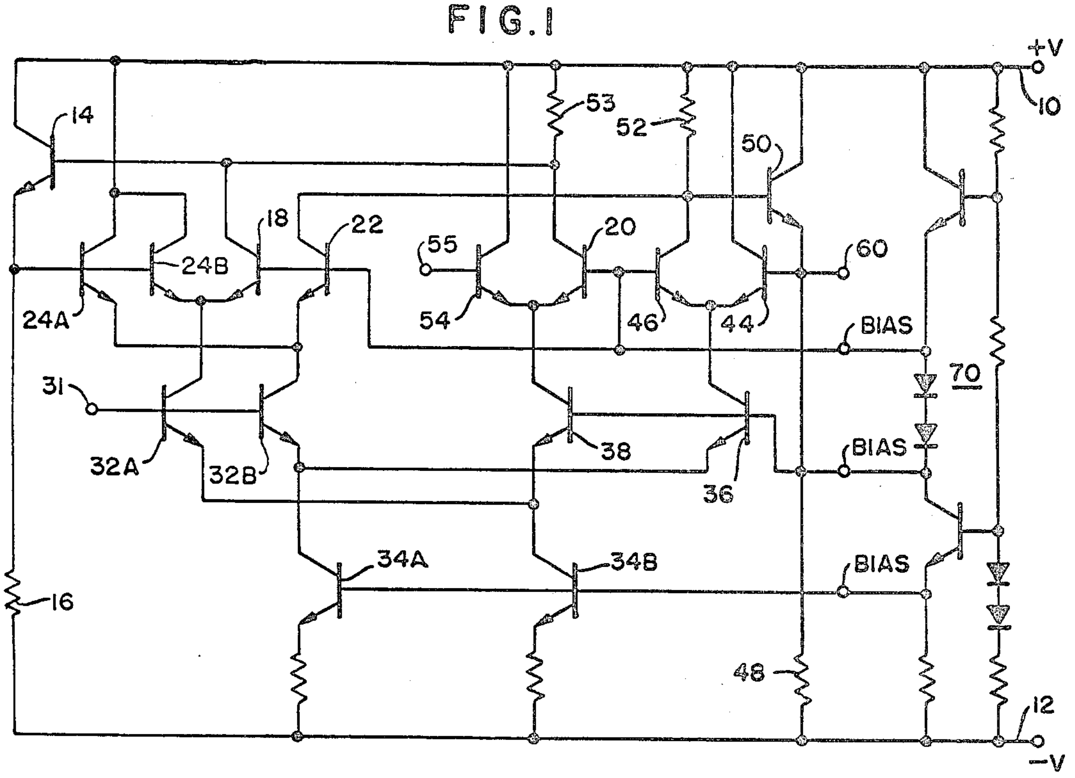
FIGS. 1 to 4 are schematic diagrams of embodiments of this invention.

In the circuits shown in the drawings, the same reference numbers are used to designate the same or similar components throughout the several figures.

Referring now to FIG. 1, the positive terminal of a power supply (not shown) may be connected to a terminal 10 and the negative terminal of the power supply may be connected to a terminal 12. The collector of an NPN feedback transistor 14 is connected to the terminal 10, and the emitter of the transistor 14 is connected through a resistor 16 to the terminal 12. All of the transistors shown in the figures of the drawings are NPN transistors, so that no further mention will be made with respect to the transistor type of the various transistors.

The base of the transistor 14 is connected to the collector of a control transistor 20 in a first section of the bistable multivibrator shown in FIG. 1 and also is connected to the collector of a transistor 18 in a second section of the multivibrator. The transistor 14 is always conductive and operates as a signal level shifter in response to the potential applied to its base. The common connection formed by the base of the transistor 14 and the collectors of the transistors 18 and 20 is coupled through a resistor 53 (having a value R) to the positive supply terminal 10, so that the feedback transistor 14 translates a high potential to its emitter whenever both the transistors 18 and 20 are nonconductive. When either of the transistors 18 or 20 is conductive, the potential applied to the base of the transistor 14 is low and it translates a low potential to its emitter.

In the section of the multivibrator which includes the transistor 18 there are three other transistors 22, 24A and 24B. The bases of the transistors 18 and 22 are interconnected to a point of bias potential obtained from a conventional reference voltage source 70, which also provides other bias potentials to different points of the circuit. The reference voltage source 70 is merely included for purposes of illustration, and other forms of voltage sources may be used to provide the different bias potentials used in the circuit. The bases of the transistors 24A and 24B are connected together and to the emitter of the feedback transistor 14. The emitters of the transistors 18 and 24B are interconnected as are the emitters of the transistors 22 and 24A. As a consequence, two parallel differential circuits are formed, one comprising the transistors 18 and 24B, and the other comprising the transistors 22 and 24A. The relative conductivity of the transistors in each of these differential circuits is controlled by the operation of the feedback transistor 14.

The interconnected emitters of the transistors 18 and 24B are connected to the collector of a transistor 32A, and the interconnected emitters of the transistors 22 and 24A are connected to the collector of a transistor 32B. The bases of the transistors 32A and 32B are connected in common to a terminal 31 to which are applied clock input pulses for the bistable multivibrator logic circuit shown in FIG. 5. The clock signals vary between "high" and "low" potentials, the terms "high" and "low" being used throughout this description to refer to the biasing potentials applied to the bases of the various transistors. When a "high" potential is applied to the base of a transistor, that transistor is rendered conductive; and when a low potential is applied to the base of the transistor, the transistor is rendered nonconductive. Since the bases of the transistors 32A and 32B are interconnected, it is apparent that these two transistors are rendered conductive or nonconductive together.

The transistors 32A and 32B form a pair of transistors in a first portion of a differential current steering gate, the other portion of which includes a similar pair of transistors 36 and 38. The bases of the transistors 36 and 38 are coupled in common to a bias point in the reference voltage source 70.

Operating current for the circuit is obtained by way of a pair of constant current source transistors 34A and 34B each of which are biased from the reference voltage source 70 to provide the same current I at their collectors. The emitter of the transistor 32A is coupled in common with the emitter of the transistor 38 to the collector of the current source transistor 34B, and the emitter of the transistor 32B is connected in common with the emitter of the transistor 36 to the collector of the current source transistor 34A.

The differential current steering gate formed by the transistors 32A, 32B, 36 and 38 operates such that when the transistors 32A and 32B are conductive, the transistors 36 and 38 are nonconductive, and vice versa. Thus, at all times there is only one conductive transistor connected to the collectors of each of the current source transistors 34A and 34B, so that whenever any of the transistors of the current steering gate are conductive, they conduct a current having a value of I.

The collector of the transistor 36 in the right-hand portion of the current steering gate is connected to the emitters of a pair of transistors 44 and 46 connected in a differential amplifier circuit configuration. The base of the transistor 46 is connected to the same bias point coupled to the bases of the transistors 18, 20 and 22. The base of the transistor 44 is connected to the junction of the emitter of a feedback transistor 50 and a resistor 48, coupling the emitter of the transistor 50 to the negative supply terminal 12. The collector of the transistor 50 is connected to the positive supply terminal 10 and its base is connected to the collectors of the transistors 22 and 46 at a junction with a resistor 52, the other side of which is connected to the positive terminal 10. The value of the resistor 52 is selected to be equal to the value (R) of the resistor 53. The transistor 50 is a level shifting transistor which operates in the same manner as the transistor 14.

Whenever either of the transistors 46 or 22 is rendered conductive, a low potential is applied to the base of the transistor 50. This causes a low potential to appear on an output terminal 60 and the transistor 44 is held nonconductive. Whenever both of the transistors 22 and 46 are nonconductive, a high potential is applied to the base of the feedback transistor 50. This causes a high potential to appear at the output terminal 60 and biases the transistor 44 into conduction, provided the transistor 36 also is rendered conductive at the same time.

Control of the conductivity of the transistor 20, whenever the transistor 38 also is conductive, is established by connecting the transistor 20 in a differential circuit with a transistor 54. The emitters of the transistors 20 and 54 are connected in commmon to the collector of the transistor 38 in the differential current steering gate. The collector of the transistor 54 is connected directly to the positive terminal 10 and the base of the transistor 54 is connected to an information input terminal 55. The signals applied to the terminal 55 are logic or information input signals having either a "high" or a "low" potential relative to the bias potential applied to the base of the transistor 20. Whenever a high information input potential is applied to the terminal 55 and the transistor 38 is conductive at the same time, the transistor 54 is rendered conductive and the transistor 20 is rendered nonconductive. The converse is true when a low potential is applied to the base of the transistor 54 on the terminal 55.

The circuit shown in FIG. 1 can take any one of four stable states: (1) the input voltage on terminal 31 low and the output voltage on terminal 60 low; (2) the input voltage low and the output voltage high; (3) the input voltage high and the output voltage low; and (4) both the input and output voltages high.

The feedback transistors 14 and 50 serve as level translating devices and may be replaced accordingly by other level translating devices with appropriate bias level changes. The resistors 16 and 48 are used to bias the transistors 14 and 50 to the proper operating currents. These resistors could be replaced by other current limiting devices, such as current sources if desired.

Assume as an initial condition that the logic input on the terminal 55 is low and that the output on the terminal 60 also is low. With the clock input applied to the terminal 31 also low, the transistors 32A and 32B are nonconductive, causing the transistors 18, 22, 24A and 24B to be nonconductive. Since the transistors 32A and 32B are nonconductive, the current I on each of the collectors of the current source transistors 34A and 34B is pulled from the emitters of the transistors 36 and 38, respectively, since both of these latter transistors are conductive when the transistors 32A and 32B are nonconductive.

Since, in the present example, the logic input on the terminal 55 is low, the transistor 54 is nonconductive and the current I from the transistor 38 flows through the transistor 20 and therefore through the resistor 53. This causes a low voltage to be applied to the base of the feedback transistor 14 causing a low potential to appear on its emitter. At the same time, since in the present example the output at the terminal 60 was considered to be low, the transistor 44 is nonconductive; so that the transistor 46 is conductive. The current I provided by the transistor 36 then flows through the transistor 46 and the resistor 52, causing the feedback transistor 50 to have low potential on its emitter. This holds the transistor 44 nonconductive and the output on the terminal 60 low.

Now assume that the clock input on the terminal 31 continues to be low, but the logic input on the terminal 55 becomes high. The transistors 32A and 32B continue to be nonconductive, while the transistors 36 and 38 are conductive. At the same time, the transistors 18, 22, 24A and 24B remain nonconductive. The transistor 46 remains conductive while the transistor 44 is nonconductive. The transistor 20, however, changes from a conductive state to a nonconductive state since the transistor 54 is biased to a state of conduction by the high input on the terminal 55. When the transistor 20 becomes nonconductive at the same time the transistor 18 is nonconductive, the potential on the base of the transistor 14 becomes high. No change in the conductivity in any of the transistors 18, 22, 24A or 24B, however, takes place at this time because the transistors 32A and 32B are not conductive. The base of the transistor 50 continues to be biased low, maintaining the transistor 44 nonconductive and the output on the terminal 60 low. Thus, the circuit is stable in this mode of operation but no change in the output has occurred.

Assume now that initially the input applied to the clock terminal 31 is low and that the information input applied to the terminal 55 also is low but that the output is high. The transistors 32A, 32B, 18, 22, 24A, 24B, 46 and 54 are all nonconductive. The transistors 20, 36, 38 and 44 are conductive in this state of operation. The transistor 14 has a low potential on its emitter due to the low potential applied to its base as a result of the conduction of the transistor 20. The transistor 50 has a high potential on its emitter since the transistors 46 and 22 both are nonconductive. The high potential on the emitter of the transistor 50 causes sufficient base current to flow to maintain the transistor 44 conductive. The circuit is stable in this mode of operation, causing a high output to appear on the terminal 60.

Assume that the input signal applied to the clock terminal 31 then continues to be low but that the information signal applied to the terminal 55 changes from a low to a high state. The transistors 32A, 32B, 18, 22, 24A, 24B and 46 remain nonconductive. The transistors 36, 38 and 44 remain conductive. The transistor 54, however, is biased to a state of conduction and the transistor 20 is biased to a nonconductive state. Thus, both of the transistors 14 and 50 translate a high potential to their emitters. The circuit is stable in this state.

Thus, it can be seen that the described circuit is stable in any one of four states with low signals applied to the clock terminal 31.

Now assume that the signal on the clock terminal 31 goes from low to high at a time when the information signal on the input terminal 55 and the output on the terminal 60 both are low. When this occurs, the transistors 32A and 32B are rendered conductive with the transistors 36 and 38 being rendered nonconductive. Thus, a current path is established from the collectors of the transistors 32A and 32B for the transistors 18, 22, 24A and 24B. The transistors 24A and 24B, however, are not rendered conductive since the emitter potential of the transistor 14 is low for the conditions which have been established at the start of this example. The transistors 18 and 22, however, each conduct a current of I through the respective ones of transistors 32A and 32B connected to their emitters. Conduction of the transistor 18 maintains the emitter potential of the transistor 14 low.

With the transistors 36 and 38 being nonconductive no current is supplied to the emitters of the transistors 20, 44, 46 and 54 so that all of these transistors become nonconductive. Conduction of the transistor 22 maintains the potential on the base of the transistor 50 low, which in turn causes the output on the terminal 60 to be maintained low. Therefore, when the input 55 and the output 60 are low initially and the clock pulse on the terminal 31 goes from low to high, there is no change in the output on the terminal 60.

Now assume that the initial circuit condition is such that the logic or information input on the terminal 55 is high and the output on the terminal 60 is low when the signal on the clock terminal 31 goes from low to high. For this initial set of conditions, the emitter potential of the transistor 14 was high when the clock pulse signal on the terminal 31 went high. As stated previously, a high clock pulse signal causes the transistors 32A and 32B to be rendered conductive, providing a current path for the transistors 18, 22, 24A and 24B. Since the emitter potential of the feedback transistor 14 is high, a high potential is applied to the bases of the transistors 24A and 24B rendering these transistors conductive and causing the transistors 18 and 22 to be nonconductive. Thus, the current on the collectors of the differential current steering gate transistors 32A and 32B is applied respectively to the emitters of the transistors 24B and 24A causing them each to conduct a current of I. At the same time, the transistors 36 and 38 are nonconductive, so that all of the transistors 20, 44, 46 and 54 are nonconductive. The transistor 14 remains in its high condition since both of the transistors 18 and 20 are nonconductive, and the transistor 50 assumes its high state since both of the transistors 22 and 46 are nonconductive. As a result, the output on the terminal 60 goes high. Therefore, when the clock signals on the terminal 31 go from a low to a high state at a time when the output on the terminal 60 is low and the logic input on the terminal 55 is high, the output changes from a low to a high condition.

Next assume that the information input on the terminal 55 is low and the output on the terminal 60 is high at the time that the clock signal is on the terminal 31 goes from a low to a high condition. Once again the transistors 32A and 32B are rendered conductive while the transistors 36 and 38 become nonconductive. Since the transistor 20 was on just prior to the time that the clock input on the terminal 31 went high, the transistor 14 was biased to its low state and the transistors 24A and 24B are nonconductive. When the transistors 32A and 32B then are rendered conductive, the transistors 18 and 22 both conduct the current I supplied by the respective transistors 32A and 32B. At the same time, the transistors 36 and 38 are nonconductive so that all of the transistors 20, 44, 46 and 54 are nonconductive. The conduction of the transistor 18, however, maintains the transistor 14 in its low state, so that the transistors 24A and 24B are held nonconductive. Conduction of the transistor 22 also causes the base of the transistor 50 to have a low potential applied to it, biasing the transistor 50 to a low state. As a consequence, when the logic input on the terminal 55 is low and the output on the terminal 60 is high at the time the signals on the clock terminal 31 go from low to high, the output 60 then goes from high to low.

Finally, assume that the information input on the terminal 55 is high and the output 60 is high at the time that the input signal on the clock terminal 31 goes from a low to a high state. Since the information input 55 was high just prior to the clock signal on the terminal 31 becoming high, the transistor 14 is in a high state, causing the transistors 24A and 24B to be conductive when the transistors 32A and 32B are rendered conductive. Thus, when the clock goes high the transistors 36, 38, 20, 44, 46 and 54 are nonconductive. The transistors 22 and 18 are nonconductive since the transistors 24A and 24B are conductive, and the transistor 14 remains in a high state as does the transistor 50, so that the output on the terminal 60 remains high. As a consequence, when the information signal applied to the input terminal 55 and the output on the terminal 60 both are high when the clock signals applied to the terminal 31 go from a low to a high state, the output on the terminal 60 remains high.

All of the above operations remain as described as long as the several inputs are not changed.

As is apparent from the foregoing, whenever any of the transistors 18, 22, 24A, 24B, 44, 46 or 54 is rendered conductive, such a transistor conducts a current of I. It also should be noted that whenever current flows through either of the resistors 52 or 53, the current flow therethrough is the result of the conduction of a single transistor, so that a current I is the only value of current which flows through these resistors. Thus the changes in level translated by the feedback transistors 14 and 50 are the same for all of the various states of the circuit which have been described.

The split current sources 34A and 34B and the use of a pair of transistors in each of the two portions of the differential current steering gate, reduces the number and size of the resistors which are needed in the circuit to maintain uniform level translation of the signals in the circuit. This in turn reduces the total chip area required to implement the circuit in a monolithic integrated circuit form since the area occupied by the additional transistors of the split current sources and the steering gate is less than the area which would be necessary for additional resistors if these additional transistors were not employed.

Figure 2:
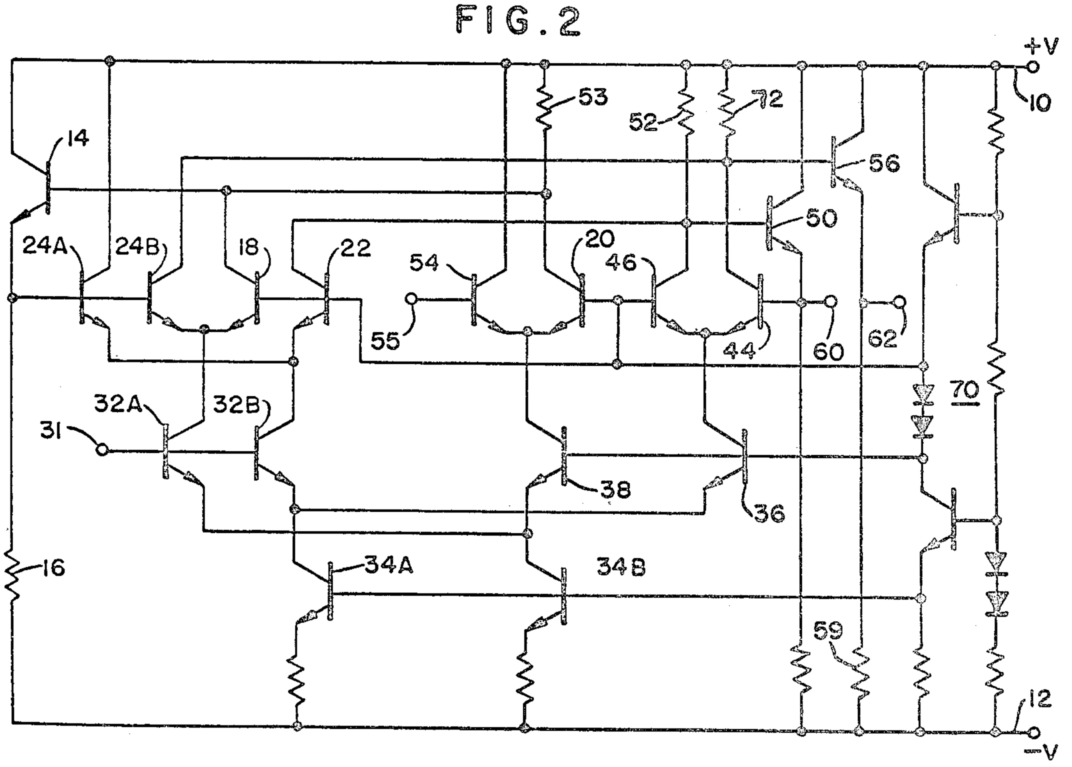

It should be noted that the circuit of FIG. 1 does not provide for an inverse output. If such an inverse output is desired in addition to the normal output obtained from the emitter of the transistor 50 at terminal 60, this can be accomplished by the addition of another output transistor. Such a modification to the circuit of FIG. 1 is shown in FIG. 2 in which most of the circuit components are the same as those shown in FIG. 1 and operate in the same manner. In FIG. 2, however, the collectors of the transistors 24B and 44 are coupled through an additional resistor 72 (having a resistance value R which is the same as the resistance value of the resistors 52 and 53) to the positive V+ terminal 10. The collectors of these transistors 24B and 44 also are connected to the base of a transistor 56 the collector of which is connected to the V+ terminal 10 and the emitter of which is connected through a resistor 59 to the negative supply terminal 12. The function of the resistor 59 is similar to the function of the resistors 16 and 48. An inverse output terminal 62 then is connected to the emitter of the transistor 56; and an analysis of the circuit operation which previously has been described will show that whenever the output on the terminal 60 is low, the output on the terminal 62 is high and vice-versa.

Figure 3:
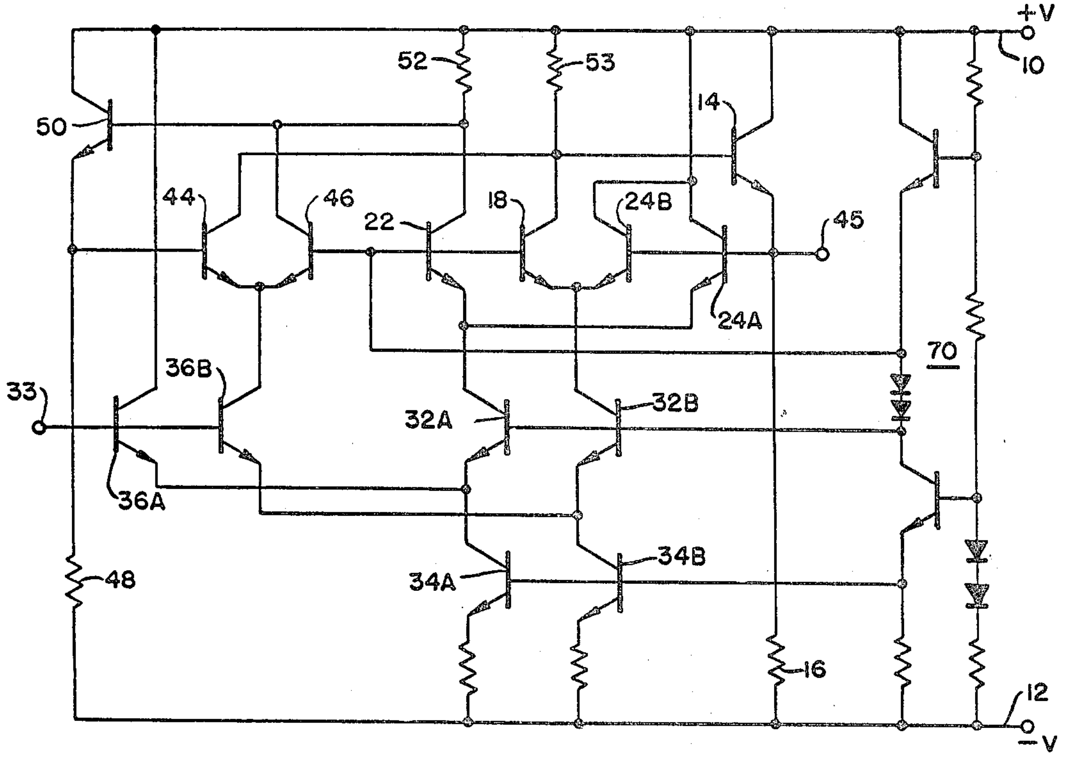

In FIG. 3 there is shown another embodiment of the circuit which operates as a frequency divider or "toggle" flip-flop circuit. The circuit of FIG. 3 is substantially the same as the circuit shown in FIG. 1, except that an information input terminal 55 to the circuit no longer is utilized. As a result, transistors 20, 54 and 38 have been eliminated from the circuit. The feedback transistor 14 is controlled by the transistor 18 as in FIG. 1 and in addition is controlled by the transistor 44 since the collector of the transistor 44 now is coupled to the junction of the collector of the transistor 18 with the resistor 53 instead of being connected to the V+ terminal as it was in FIG. 1. The feedback transistor 50 continues to be controlled by the conduction of the transistors 22 and 46 as it was in FIG. 1.

Since with the toggle flip-flop of the circuit of FIG. 3 the transistor 38 is not employed, the transistor 36 of the differential current gate of FIG. 3 also has been replaced with a pair of transistors 36A and 36B, both of which are controlled by input signals applied to an input terminal 33. The bases of the transistors 32A and 32B have been connected to a bias point in the reference voltage source 70, but the conductivity of the two portions of the differential current steering gate is controlled in the same manner as the circuit configuration shown in FIGS. 1 and 2, in which the clock input signals were applied to the bases of the transistors 32A and 32B. The collector of the transistor 36A is connected directly to the V+ terminal 10 and the collector of the transistor 36B is connected to the emitters of the transistors 44 and 46 in a manner similar to the connections of the transistor 36 in FIG. 1.

In the operation of the divider circuit of FIG. 3, the input wave applied to the terminal 33 may be a wave of the type often used in logic circuits which varies rapidly between two voltage levels (low and high) at a periodic rate. The input terminal corresponds in function to the clock input terminal 31 of FIG. 1, with the exception that a constant bias is applied to the bases of the transistors 32A and 32B in FIG. 3 and the input signals are applied to the bases of the transistors 36A and 36B. The differential current gating operation of the transistors, however, is the same in the circuit shown in FIG. 3 as in the circuit of FIG. 1 which has been described.

Assume initially that the input terminal 33 is low and that the output terminal 45 at the emitter of the feedback transistor 14 also is low. Then the transistors 36A and 36B, 44 and 46 are nonconductive and the transistors 32A, 32B, 18 and 22 are conductive. Since the output on the terminal 45 is low, the transistors 24A and 24B are nonconductive and the transistor 14 is in its low state. The transistors 24A and 24B are nonconductive because there is insufficient base current for these transistors due to the low state of the transistor 14. The transistor 50 is in a low state since the collector voltage on the transistor 22 is low for this condition of operation. The transistor 14 is maintained in a low state since the base potential for this transistor is derived from the collector of the conductive transistor 18.

Now assume that the wave applied on the terminal 33 goes high. This causes the transistors 36A and 36B to be made conductive to conduct the current I provided by the respective split current source transistors 34A and 34B. The path provided by the transistor 36B causes the transistor 46 to conduct this current of I. This in turn maintains the low voltage on the base of the transistor 50, so that the transistor 50 stays in its low state thereby holding the transistor 44 nonconductive. Thus, all of the current I provided by the constant current source 34B flows through the transistor 46. Since the transistors 32A and 32B are nonconductive at this time, the transistors 18, 22, 24A and 24B also are nonconductive. This in turn causes the transistor 14 to be biased to a high state since both of the transistors 18 and 44 are nonconductive, and the potential on the output terminal 45 goes to a high value.

Now assume that the wave applied at terminal 33 goes low while the transistor 14 is in its high state. When this occurs the transistors 36A and 36B are rendered nonconductive. This causes the transistors 44 and 46 both to be nonconductive. The transistors 32A and 32B become conductive; and since the transistor 14 is in its high state, with high potential on its emitter, the transistors 24A and 24B are biased to a high state of conduction, each conducting current I present on the respective collectors of the transistors 32A and 32B. The transistors 18 and 22 remain nonconductive since the transistors 24A and 24B are conductive. Thus the voltage at the output 45 remains high. With both of the transistors 46 and 22 nonconductive, the bias on the base of the transistor 50 becomes high to bias the transistor 50 to its high state.

Now assume that the input 33 next goes high. The transistors 36A and 36B once again become conductive with the transistors 32A and 32B becoming nonconductive. The transistor 44 conducts since the transistor 50 is in its high state. The transistor 46 remains nonconductive since there is no current supplied for it and the current I drawn by the transistor 44 flows through the resistor 53 and the transistor 44. The transistors 18, 22, 24A and 24B are nonconductive due to the nonconductive state of the transistors 32A and 32B. The current I through the resistor 53 decreases the voltage on the base of the transistor 14 so that it is biased to its low condition, and the output voltage on the terminal 45 then becomes low.

As is apparent from the foregoing description, there are two cycles of the input signal on the input terminal 33 which produce a single cycle of output signal on the output terminal 45. Thus, the device of FIG. 3 operates as a divide-by-two frequency divider or toggle flip-flop. It should be noted that the emitter-follower feedback transistor 14 acts as a level shifting device for the output of the frequency divider of FIG. 3.

Figure 4:
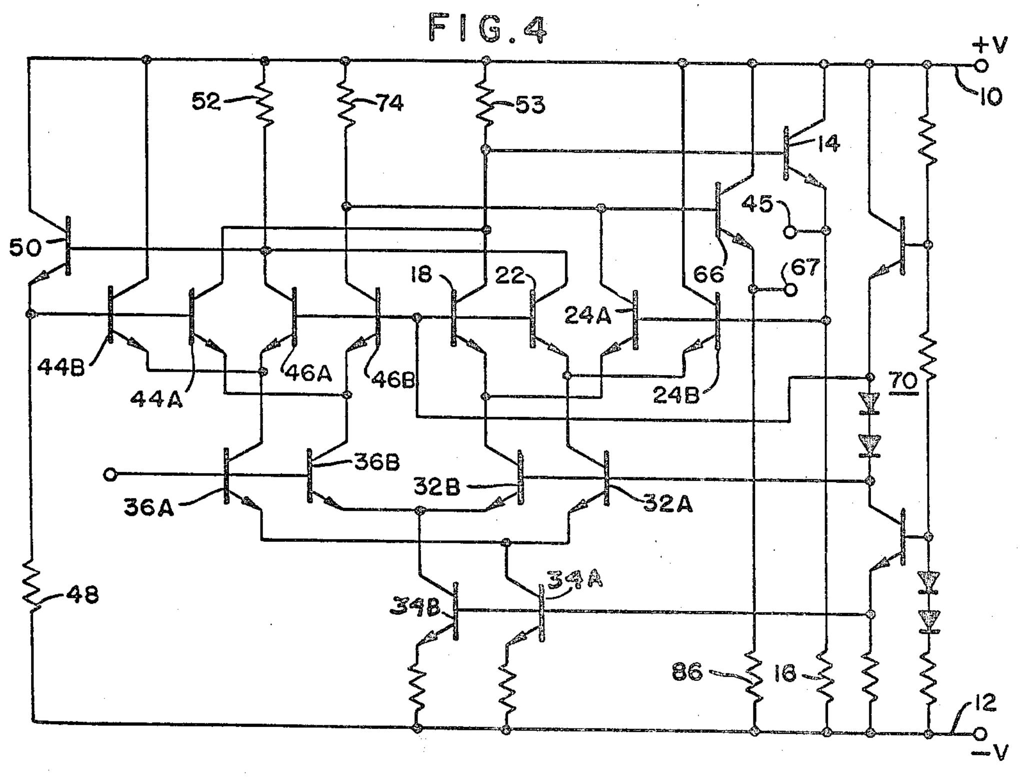

To provide an inverted output from a toggle flip-flop circuit of the type shown in FIG. 3, the circuit of FIG. 4 may be utilized. The circuit of FIG. 4 is similar to the circuit of FIG. 3 with the exception that the transistors 44 and 46 of FIG. 3 each have been replaced with a pair of transistors 44A, 44B and 46A, 46B, respectively. The collector of the differential current switching transistor 36B then is connected to the emitters of the transistors 44A and 46B while the collector of the transistor 36A is connected to the emitters of the transistors 44B and 46A. The collector of the transistor 44B is connected to the V+ terminal 10, while the collector of the transistor 44A is connected to the base of the transistor 14 and through the resistor 53 to the V+ terminal 10.

The transistor 46A provides the current connections supplied by the transistor 46 of FIG. 3, while transistors 46B and 24A are connected through an additional resistor 74 (of the same value R as the resistors 52 and 53) to the V+ terminal 10. The junction of the collectors of the transistors 46B and 24A with the resistor 74 also is connected to the base of an inverse output emitter-follower transistor 66, the collector of which is connected to the V+ terminal 10 and the emitter of which is connected through a resistor 86 to the terminal 12. An inverse output terminal 67 also is coupled to the emitter of the transistor 66.

Whenever either of the transistors 24A or 46B are conductive, the transistor 66 is in its low state of conduction; and when both of the transistors 24A and 46B are nonconductive, the transistor 66 is in its high state of conduction. Thus, the signals appearing on the output terminal 67 are the inverse of the signals appearing on the output terminal 45.

We claim:

1. A bistable multivibrator including in combination:

first and second voltage supply terminals;

a first section having at least first and second transistors, each having first, second and control electrodes, the first electrodes of said first and second transistors being coupled with said first voltage supply terminal;

a second section having at least third, fourth, fifth and sixth transistors, each having first, second and control electrodes, the first electrodes of said third, fourth, fifth and sixth transistors being coupled with said first voltage supply terminal;

differential current steering gate means having first and second portions, each portion with first and second common terminals and each portion with first and second output terminals, the first output terminal of said first portion coupled with the second electrodes of the transistors of said first section, the second output terminal of said first portion coupled with said first voltage supply terminal, the first output terminal of said second portion coupled with the second electrodes of said third and sixth transistors of said second section, the second output terminal of said second portion coupled with the second electrodes of said fourth and fifth transistors;

first current source means coupling the first common terminals of said first and second portions of said current steering gate means with said second voltage supply terminal;

second current source means coupling the second common terminals of said first and second current steering gate means with said second voltage supply terminal, said first and second current source means each supplying current of the same value;

first feedback transistor means having first, second and control electrodes with the first electrode thereof coupled with said first voltage supply terminal the second electrode thereof coupled with the control electrodes of said third and fourth transistors of said second section and coupled in circuit with said second voltage supply terminal, and the control electrode thereof coupled with the first electrode of said fifth transistor of said second section;

second feedback transistor means having first, second and control electrodes with the first electrode thereof coupled with said first voltage supply terminal, the second electrode thereof coupled with the control electrode of said first transistor and coupled in circuit with said second voltage supply terminal, and the control electrode thereof coupled with the first electrodes of said second and sixth transistors; and means for applying bias potentials to the control electrodes of said second, fifth and sixth transistors.

2. The combination according to claim 1 wherein all of said transistors are of the same conductivity type.

3. The combination according to claim 1 wherein said first and second feedback transistor means are connected in emitter follower circuit configurations.

4. The combination according to claim 1 further including first resistance means coupling said first voltage supply terminal with the first electrodes of said first and fifth transistors; and second resistance means coupling said first voltage supply terminal with the first electrodes of said second and sixth transistors.

5. The combination according to claim 1 further including a control transistor having first, second and control electrodes, wherein the second output of said first portion is coupled with the second electrode of said control transistor, the first electrode of said control transistor is coupled through first resistance means to said first voltage supply terminal and is coupled with the control electrode of said first feedback transistor means; and means for rendering said control transistor conductive and nonconductive in response to input signals.

6. The combination according to claim 5 further including second resistance means coupling said first voltage supply terminal with the first electrodes of said second and sixth transistors.

7. The combination according to claim 6 wherein said first and second resistance means have the same predetermined value.

8. The combination according to claim 6 further including third resistance means coupling said first voltage supply terminal with the first electrodes of said first and fourth transistors.

9. The combination according to claim 8 wherein said first, second and third resistance means have the same predetermined value.

10. The combination according to claim 1 wherein each of said first and second portions of said current steering gate means comprises a pair of steering transistors, each having first, second and control electrodes, the first electrodes of the pair of steering transistors in each of said portions comprising said first and second output terminals, respectively, for such portions, and the second electrodes of the pairs of transistors in said first and second portions of said current steering gate means comprising the first and second common terminals, respectively, of each of said first and second portions.

11. The combination according to claim 10 further including means for applying a bias potential to the control electrodes of the pair of transistors of one of said first and second portions of said current steering gate means and means coupled with the control electrodes of the pair of transistors of the other of said first and second portions of said current steering gate means for applying a varying input signal thereto.

* * * * *